SUPERVISORY CONTROL REGISTER BUFFER

Filed May 23, 1966 Sheet 1 of 3

INVENTORS
JAMES G. PEARCE
WILLIAM W. PHARIS
BY Diske + Craig
ATTORNEYS

INVENTORS

JAMES G. PEARCE
WILLIAM W. PHARIS

BY Dicke & Craig
ATTORNEYS

INVENTORS
JAMES G. PEARCE
WILLIAM W. PHARIS

BY Dicke + Craig
ATTORNEYS

United States Patent Office 3,436,733

Patented Apr. 1, 1969

3,436,733
SUPERVISORY CONTROL REGISTER BUFFER

James G. Pearce and William W. Pharis, Rochester, N.Y., assignors to Stromberg-Carlson Corporation, Rochester, N.Y., a corporation of Delaware Filed May 23, 1966, Ser. No. 552,223
Int. Cl. G11b *13/00*
U.S. Cl. 340—172.5 10 Claims

ABSTRACT OF THE DISCLOSURE

A speed buffer for transferring information from a plurality of registers or memory segments received on a time division multiplex basis to selected ones of a plurality of receiving registers or memory segments which have different availability times from the data sources.

The present invention relates in general to data processing and control apparauts, and more particularly to an improved data transfer control apparatus for facilitating the transfer of data between asynchronously operated systems, and particularly systems which may be available only on a time share basis.

An increased interest has been evidenced in the use of time shared equipment in data processing and control systems, communication systems, and other systems where large quantities of data must be processed or transferred under specific control conditions. Through time shared use of common control equipment, the overall complexity, economy of operation, dependability and efficiency of these systems is greatly increased.

A problem which arises in data processing systems using time shared control equipment relates to the transfer of data from systems and equipment operating on a time division multiplex basis to other shared equipment which is operating asynchronously therewith on a traffic or availability basis. Certain arrangements have been proposed for effecting this transfer of data between asynchronously operated systems; however, these arrangements are primarily storage devices which receive information from a single source, store the information until the system to receive the information is available, and then transfers the information to this equipment. While satisfactory for the purposes for which they have been designed, these known arrangements are limited in their applicability to complex systems, and are particularly incapable of transferring data between a plurality of data sources and a selected one of a plurality of receiving apparatus or memory segments operating asynchronously with the data sources.

The present invention provides a speed buffer for transferring information from a plurality of registers or memory segments, or bits of information received on a time division multiplex basis to selected or associated ones of a plurality of receiving registers or memory segments which have different availability times from the data sources. The speed buffer in accordance with the invention is also capable of operating on a time share basis providing means for indicating the busy condition of the buffer and for preventing access thereto at that time.

The speed buffer arrangement in accordance with the instant invention is characterized by the provision of a means for storing an address or other indicia representing an information or data source, a register for storing the data transferred from the data source, and a gating arrangement for receiving an address or other indicia representing a data source transferred from asynchronously operated equipment associated with the data sources for receiving data therefrom for further processing or storage. The data receiving equipment may comprise a plurality of registers or memory segments, each of which are assigned to a particular data source for the receipt of data therefrom. The gating arrangement in the speed buffer compares the address which is stored therein in conjunction with the data transferred from the data source with the address applied thereto by the data receiving equipment. Upon coincidence between the address stored in the speed buffer and the address applied thereto, the data stored in the speed buffer is applied to the equipment providing the corresponding address.

A particular application for the instant invention is disclosed in U.S. application Ser. No. 552,283 filed May 23, 1966, entitled "Universal Junctor," and assigned to the same assignee as this application, which application relates to time division multiplex common control telephone equipment wherein data, such as dialing impulses associated with a particular subscribed circuit are transferred from the time division multiplex system to a particular segment of memory, which operates on a traffic basis. However, it is to be understood, that the speed buffer of the instant invention is applicable to all uses wherein data is to be transferred between asynchronously operated equipment provided on a time share basis.

It is therefore an object of the instant invention to provide a device for transfer of data between a plurality of data sources and a selective one of a plurality of storage or control devices operating asynchronously with the data sources, which device overcomes or otherwise avoids all of the difficulties heretofore experienced with similar known arrangements.

It is another object of the instant invention to provide a device of the type described which may be utilized with efficiency and dependability on a time share basis and which is uncomplicated and economical of manufacture.

These and other objects, features and advantages of the instant invention will become more apparent from the following detailed description of the invention when taken in connection with the accompanying drawings, which disclose one embodiment of the instant invention, and wherein.

Figure 1:
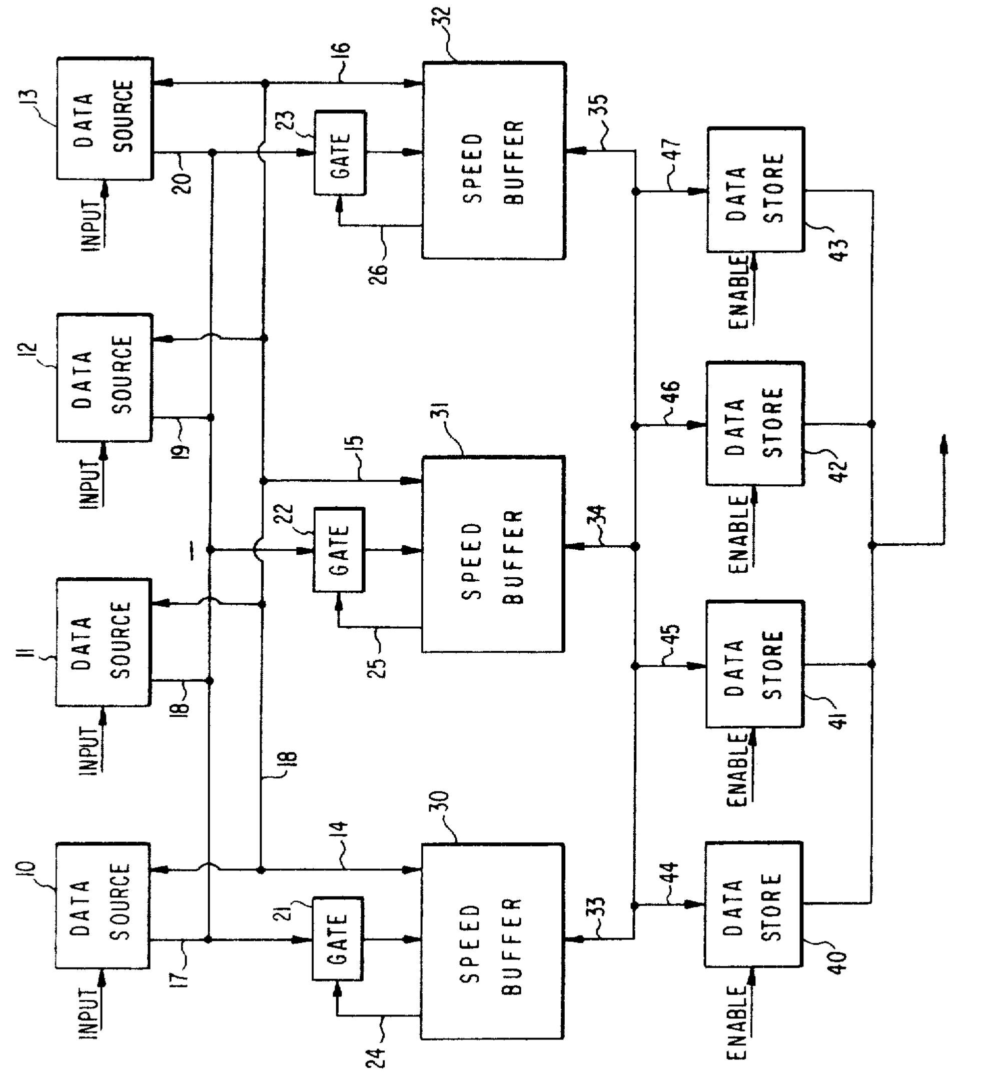
FIGURE 1 is a schematic block diagram of a system in which the speed buffer of the instant invention may be utilized.

Referring now to the drawings, and particularly to FIG. 1 thereof, a plurality of data sources 10, 11, 12 and 13, which may be in the form of registers, storage devices, memory segments or other arrangements which are adapted to receive data in a pre-arranged or random sequence for transfer to other circuits for storage or control, designated generally as data stores 40, 41, 42 and 43, are interconnected with the data stores by means of one of the speed buffers 30, 31 or 32, provided in accordance with the instant invention.

The data sources 10, 11, 12 and 13 are shown only schematically in FIGURE 1 of the drawings and may be either in the form of individual registers receiving input data in accordance with a first timing sequence, or other form of data storage arrangement such as a recirculating delay line containing a plurality of memory segments which become available for transfer of data in accordance with the inherent timing of the delay line arrangement. Basically, the form of the data sources 10–13 and the data stores 40–43 is unimportant to the instant invention so long as these elements provide for access to individual pieces of data in accordance with predetermined timing schedules, which timing schedules for the data sources and the data stores are different so that the two elements operate asynchronously.

The purpose of the speed buffer in accordance with the instant invention is to provide a means for transfer of the data provided by any one of the data sources 10–13 to a particular associated one of the data stores 40–43, providing a means for storing this data subsequent to transfer from the data source so as to compensate for the difference in timing between the data sources and the data stores.

In the illustrated embodiment of FIGURE 1 of the drawing, three speed buffers 30, 31 and 32 are associated with four data sources 10–13 and four data stores 40–43; however, the particular number on each of these elements has been selected only by way of example, so that it should be understood that a larger or smaller number of data sources and data stores may be included in the system with more or less than the three speed buffers illustrated in the drawing. The number of speed buffers which may be used with a particular number of data sources and a particular number of data stores is determined primarily by the timing sequences of the elements and the traffic requirements for the system.

Each of the speed buffers 30, 31 and 32 is individually connected to each of the data sources 10, 11, 12, and 13 via lines 14, 15 and 16. While it appears in FIGURE 1 that each of the speed buffers are interconnected via line 18, the single line designation for the lines 14–18 is provided only for purposes of clarity of illustration, and it should be understood that each of the speed buffers must be individually connected to each of the data sources, for reasons which will be made clear in the following discussion.

The speed buffers 30, 31 and 32 are available on a time share basis for transfer of information from a particular data source to its associated data store. Thus, at any given time, one or more of the speed buffers 30, 31 and 32 will be available for use by a particular data source, and this condition is transmitted individually to each of the data sources 10, 11, 12 and 13 via lines 14, 15 and 16, respectively.

At the time for transfer of information from a particular data source, for example data source 10, to its associated data store, for example data store 42, the data source 10 selects one idle speed buffer, for example, speed buffer 31, whose condition is transmitted to the data source 10 via line 15. In selecting the speed buffer 31, the data source 10 provides for physical connection to the line 15 of the speed buffer and the address of the data source is then transferred over this line to a suitable storage device in the buffer 31. At the same time, that the data source acquires the speed buffer 31 through connection to the line 15 thereof, the output line 17 of the data source is also connected to a control gate 22 for controlling input of data to the speed buffer 31. Upon insertion of the address of the data source 10 via line 15 into the speed buffer 31, a control signal for enabling gate 22 is generated and applied to line 25 to permit the data from the data source 10 to be inserted into the speed buffer 31.

The speed buffers 30 and 32 are also provided with input control gates 21 and 23, respectively, which are actuated or controlled via lines 24 and 26, respectively, upon insertion of a data source address therein.

With the address of the data source 10 and the data from this source stored in the speed buffer 31 for transfer to the data store 42, the address of the data source 10 which is also stored in the data store 42 is applied in timed sequence with addresses from the other data stores to the speed buffers 30, 31 and 32 via lines 33, 34 and 35, respectively, at the time in the timing sequence of the data stores 40 through 43 at which the data store 42 is enabled. This address which is transferred from the data store 42 is compared with the address, if any, stored in each of the speed buffers 30 through 32, and upon coincidence between the two addresses, connection is made between the particular speed buffer within which coincidence occurs, in the case of the example, speed buffer 31, and the data store 42 and the buffer is enabled so that this data is transferred from the speed buffer via lines 44 and 46 to the data store 42.

Thus, as each of the data sources 10, 11, 12 and 13 are enabled in the particular timing sequence with which they are controlled, the data in each of the data sources is systematically transferred to an idle speed buffer along with the address of the data source. During this time, the addresses of the data sources associated with each of the data stores 40 through 43 are applied continuously in the timing sequence at which the data stores are controlled to each of the speed buffers 30, 31 and 32. When coincidence between the address provided by the data source and the address provided by the data store occurs in any speed buffer, the data stored in that speed buffer is immediately transferred to the particular data store providing the correct data source address. In this way, the steps of transfer, storage and subsequent transfer between circuits operating asynchronously at different time sequences is effected in a relatively simple and efficient manner.

Figure 2:
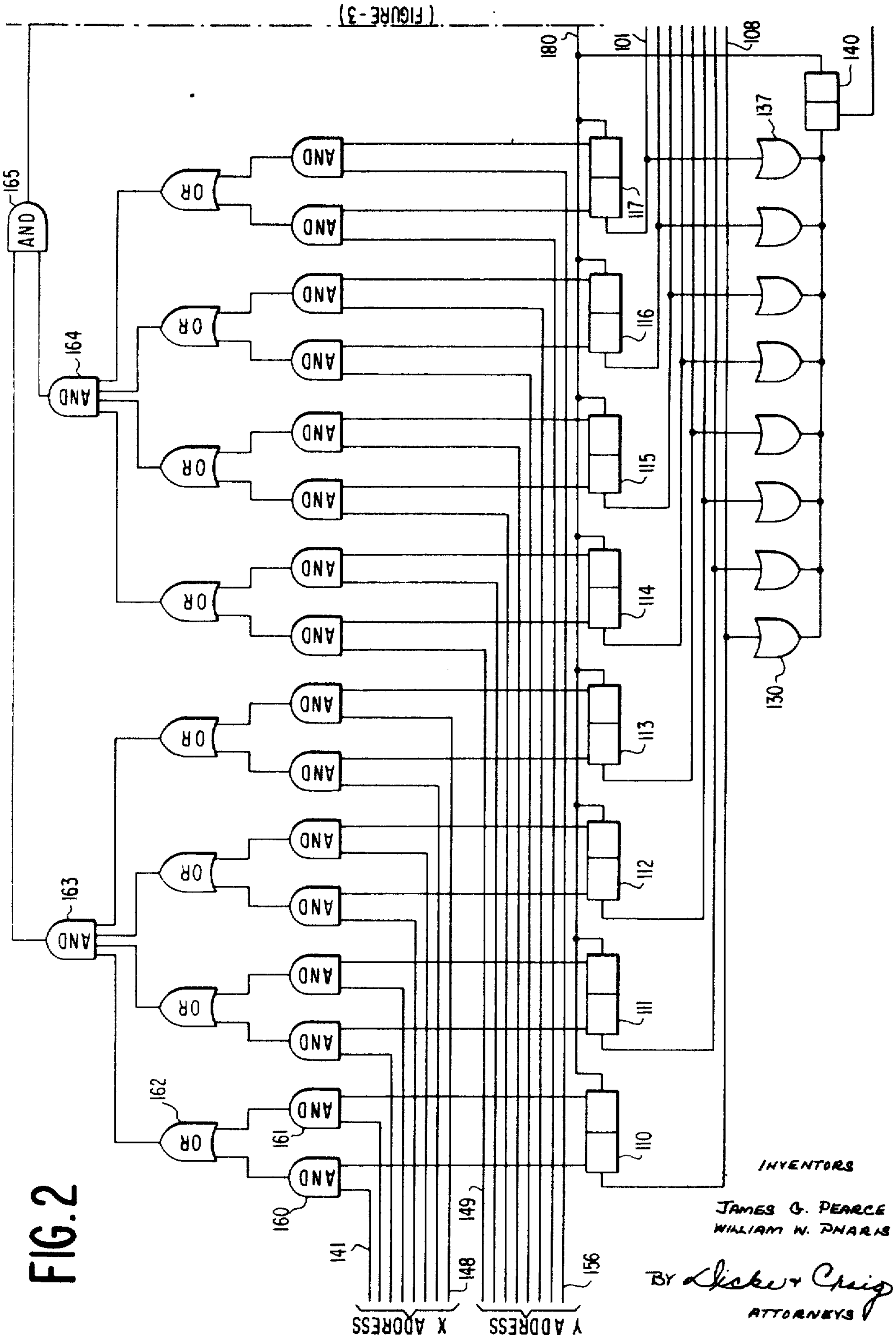
FIGURE 2 is a partial circuit diagram of the speed buffer of the invention.
Figure 3:
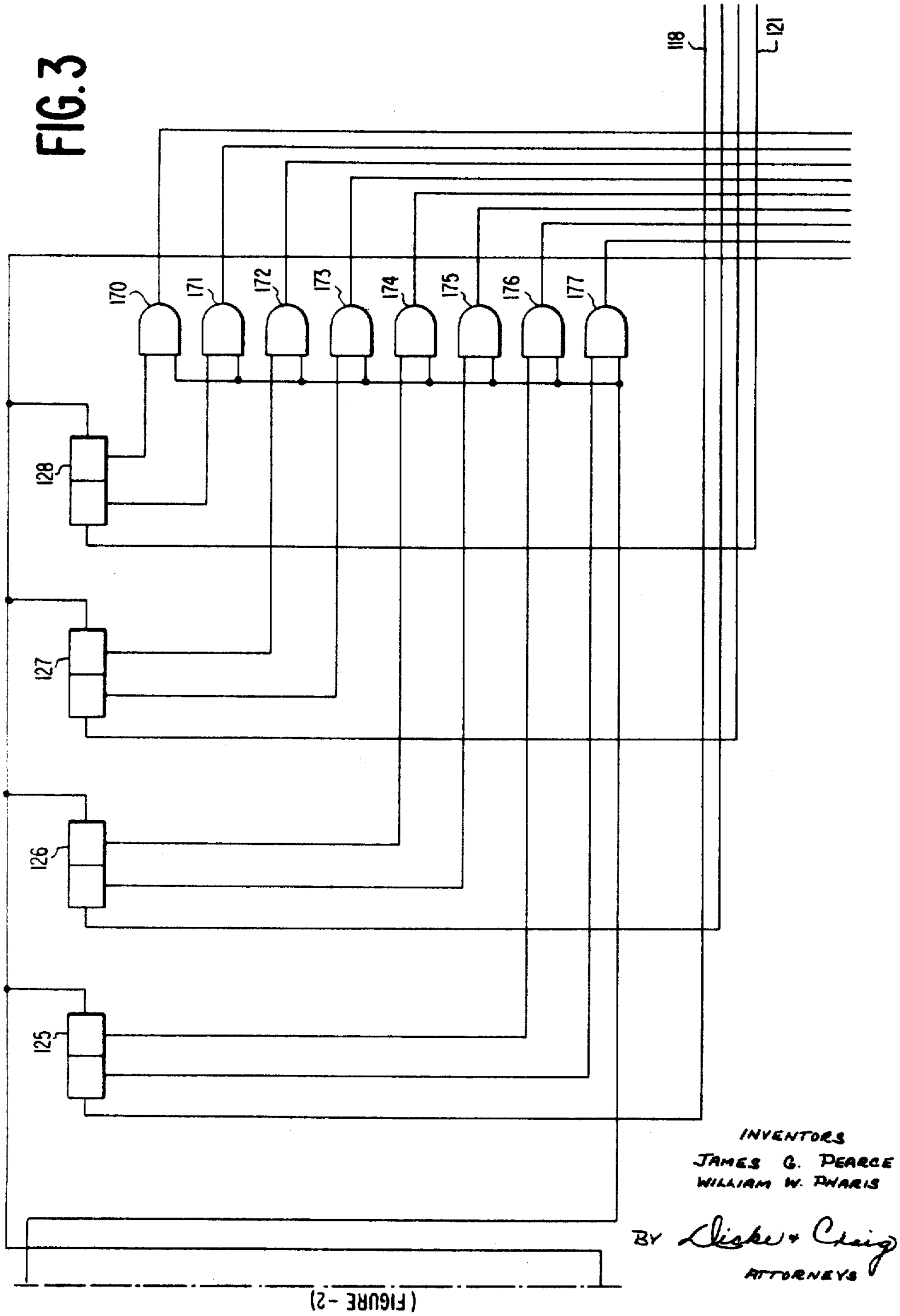
FIGURE 3 is the remaining portion of the circuit diagram of FIGURE 2.

Referring now to FIGS. 2 and 3, which disclose the specific circuit configuration of the speed buffer in accordance with the instant invention.

At the time that the speed buffer is acquired by a data source the address of that data source is inserted into the buffer by means of lines 101–108 (FIG. 2) and is stored in address flip flops 110 through 117. The four flip flops 110–113 store the X portion of the data source address while the four flip flops 114–117 store the Y portion of the data source address. The information to be transferred from the data source to its associated data store is also applied from the data source via lines 118–121 (FIG. 3) to instruction storage flip flops 125–128, which flip flops are either set or remain in the reset condition depending on the binary condition of the information applied thereto.

As soon as an address is stored in the flip flops 110–117 in the buffer, the set condition of one or more of the address flip flops is detected by a series of OR gates 130–137 which are connected to respective ones of the address input lines 101–108. A set condtion of any one of the address flip flops 110–117 will result in application of a control signal via the associated OR gate 130–137 to a buffer busy store flip flop 140 which is set by the application of such a signal. The output of the buffer busy store flip flop 140 is applied to the gate associated with the data source, such as gate 22, as a transfer enable pulse indicating that the buffer is ready for transfer of the instruction or data from the data source to the flip flops 125–128 in the buffer data section. An output signal from the busy store flip flop 140 also indicates the busy condition of the buffer to the remaining data sources until the information in the buffer is transferred to the associated data store and the buffer is cleared.

With the address of the data source associated with the information to be transferred stored in the flip flops 110–117, and the information or instruction stored in the flip flops 125–128, the buffer waits until the data store assigned to the particular data source associated with the stored information is accessible so that transfer of the stored information in the buffer can be effected at the proper time into the data store. As each data store becomes accessible for receipt of information, it applies the address of the data source to which it is associated to the speed buffer where it is applied via input address gates 141–148 and 149–156. The inputs 141–148 provide for the X portion of the address, including both set and reset signals for each character, and the input lines 149–156 provide the Y portion of the address and also include both the set and rest signals for each character of the address.

The X and Y address applied from the register control to the register buffer is then compared with the X and Y address of the data source associated with the information stored in the buffer to determine whether information is provided in the buffer for the data store presently enabled. When the address is provided by the data store and the data source coincides in the speed buffer, then the information stored in the buffer can be transferred to the data source. The comparison between the two addresses is effected by a series of AND and OR gates formed in combinations such as provided by AND gates 160 and 161 and OR gates 162.

The AND gate 160 of each identical group is connected to the "set" side of the first character of the address provided by both the data store and the flip flops 110 of the buffer along which the AND gate 161 of each group receives the "reset" signal of the first character provided by the data store and the reset side of flip flop 110. Thus, if a "one" is received as the first character of the address from both the data store and the flip flop 110, the AND gate 160 will be enabled applying a signal through OR gate 162 to an AND gate 163 which combines output signals for each of the four characters of the X address. On the other hand, if the first character of the X address as provided by both the data store and the flip flop 110 is a zero the AND gate 161 will be enabled applying control signal through OR gate 162 to the AND gate 163.

In the same manner, if coincidence occurs between the X address provided by the data store, and that stored in the flip flops 110–113 and coincidence also occurs between the Y address from the data store and the address stored in flip flops 114–117, both AND gates 163 and 164 will be enabled thereby enabling AND gate 165 to which each is connected so as to provide a transfer control signal in the output of this AND gate 165. This transfer control signal is utilized to transfer the information stored in the instruction portion of the buffer in flip flops 125–128 to the data store.

If there is a lack of coincidence between the address provided by the data store and that stored in the flip flops 110–117, for example, if the initial character of the X address provided by the register control is a "one" and the initial character stored in the flip flop 110 is a "zero," neither AND gate 160 nor 161 will be enabled so that no control output will be applied through OR gate 162 to the AND gate 163. Under these circumstances, the AND gate 163 will not be enabled thereby preventing enabling of the AND gate 165 so that no transfer control signal can be generated under these circumstances. Exact correspondence between the address provided from the data store and that provided from the data source to the speed buffer must be obtained before a transfer of information from the buffer to the data source will be possible.

The information stored in flip flops 125–128 (FIG. 3) is applied to a series of AND gates 170–177 which store both the set and reset values provided by the flip flops 125–128. The AND gates 170–177 are simultaneously enabled by the transfer control signal derived from AND gate 165 (FIG. 2) indicating that exact correspondence between the address of the data source and the address of the available data store has occurred.

As soon as the information is received in the data store, an "information stored" signal is returned to the buffer by the data store via line 180 (FIG. 2) which resets all of the flip flops 110 through 117 and 125–128, and also resets the buffer busy store flip flop 140 to indicate the free condition of the buffer. The buffer is then available immediately for another data source.

While we have shown and described several embodiments in accordance with the present invention, it is understood that the same is not limited thereto but is susceptible of numerous changes and modifications as known to a person skilled in the art, and we therefore do not wish to be limited to the details shown and described therein but intend to cover all such changes and modifications as are encompassed by the scope of the appended claims.

We claim:

1. In an asynchronous system including a plurality of data sources each having a distinctive address in the form of binary bit combinations and a plurality of associated data storage devices each periodically enabled to transmit the address of the data source with which it is associated and receive data, a speed buffer for transfer of data from a data source to its associated data storage device, comprising:

address storage means connected to each of said data sources for receiving and storing an address of one of said data sources in a first timing sequence, data storage means connected to each of said data sources for receiving and storing data from one of said data sources in said first timing sequence, first gating means receiving data source address information from said data storage devices in a second timing sequence different from said first timing sequence, second gating means interconnecting said data storage means and said data storage devices for transfer of data therebetween upon being enabled, third gating means comparing the address information in said address storage means and said first gating means for enabling said second gating means upon complete coincidence between said address information therein.

2. A speed buffer as defined in claim 1 and further including busy store means for detecting the presence of information from one data source in said address storage means and generating a first signal in response thereto, the output of said busy store means being connected to each data source for hindering the transfer of data to said buffer from all but one data source.

3. A speed buffer as defined in claim 2 wherein said busy store means includes a plurality of "OR" gates connected to said address storage means and a flip flop providing said first signal in the set state thereof, said "OR" gates being connected to said flip flop for switching said flip flop to the set state thereof.

4. A special buffer as defined in claim 1 wherein said address storage means and said data storage means include a plurality of flip flops for storing data in the form of impulses of first and second levels.

5. A speed buffer as defined in claim 1 wherein said third gating means includes a plurality of gating combinations each comprising first and second AND gates connected to the input of an OR gate.

6. In combination, a plurality of data sources each having a distinctive address in the form of binary bit combinations and data which is transmitted in a prescribed time slot of a first timing sequence, a plurality of storage devices each periodically enabled to transmit the address of the data source with which it is associated and receive data in a prescribed time slot of a second timing sequence different from said first timing sequence, and a speed buffer means for receiving data from one of said data sources in time with said first timing sequence and transmitting said data to a data storage device in time with said second timing sequence, said data storage devices including means for scanning said speed buffer means periodically to determine the presence of data therein designated for said device.

7. The combination as defined in claim 6 wherein said buffer means includes busy store means for preventing access to more than one data source at a time.

8. The combination as defined in claim 7 wherein said buffer means includes storage means for storing address information and data from a data source.

9. The combination as defined in claim 8 wherein said buffer means further includes comparison means for comparing address information stored in said storage means and address information received from a data storage device to enable transfer of said data in said storage means to the storage device providing a coincident address.

10. The combination as defined in claim 9 including a plurality of speed buffer means available to said data sources and said storage devices on a time share basis.

References Cited

UNITED STATES PATENTS

| | | | |
|---|---|---|---|
| 3,312,950 | 4/1967 | Hillman et al. | 340—172.5 |
| 3,288,928 | 11/1966 | Bartlett et al. | 178—50 |
| 3,283,308 | 11/1966 | Klein et al. | 340—172.5 |
| 3,283,306 | 11/1966 | Patrusky | 340—172.5 |
| 3,248,709 | 4/1966 | Betz | 340—172.5 |
| 3,218,611 | 11/1965 | Kilburn et al. | 340—172.5 |

GARETH D. SHAW, *Primary Examiner.*